United States Patent [19]

Possati

[11] 4,290,204
[45] Sep. 22, 1981

[54] PLUG GAUGE FOR CHECKING INTERNAL GEOMETRIC DIMENSIONS

[75] Inventor: Mario Possati, Bologna, Italy

[73] Assignee: Finike Italiana Marposs, S.p.A., S. Marino di Bentivoglio, Italy

[21] Appl. No.: 94,727

[22] Filed: Nov. 15, 1979

[30] Foreign Application Priority Data

Dec. 1, 1978 [IT] Italy .................................. 3612 A/78

[51] Int. Cl.³ .......................... G01B 5/12; G01B 7/12; G01B 3/26
[52] U.S. Cl. ............................... 33/178 E; 33/143 L; 33/147 K
[58] Field of Search ............. 33/143 L, 147 K, 147 N, 33/178 R, 178 E, DIG. 7

[56] References Cited

U.S. PATENT DOCUMENTS

| | | | |
|---|---|---|---|
| 3,958,337 | 5/1976 | Anichini | 33/143 L |
| 3,958,338 | 5/1976 | Anichini et al. | 33/178 E |
| 4,067,114 | 1/1978 | Meyer, Jr. | 33/178 R |
| 4,077,130 | 3/1978 | Possati | 33/178 E |

OTHER PUBLICATIONS

"Universal Diatest", Catalog No. 369, 8 pp., 12-1972.

*Primary Examiner*—Richard R. Stearns
*Attorney, Agent, or Firm*—Stevens, Davis, Miller & Mosher

[57] ABSTRACT

The gauge includes two movable members carrying relevant feelers for contacting the bore surface of a piece for checking its internal diameter. The two movable members are obtained by making a longitudinal cut and a transversal bore in a single part. A resilient lamina is coupled to the movable members and a wire is connected between the lamina and the movable element of a transducer to transform the radial movements of the feelers into axial displacements of the transducer element.

9 Claims, 2 Drawing Figures

PLUG GAUGE FOR CHECKING INTERNAL GEOMETRIC DIMENSIONS

The present invention relates to a plug gauge for checking internal geometrical dimensions of bores of mechanical parts, with a supporting section; two members associated with said section and movable with respect to the same; two feelers adapted to contact the part to be checked, each feeler being coupled to a relevant movable member in such a way as to be movable substantially in a radial direction with respect to a longitudinal axis of the gauge; a position transducer, with a movable element, the transducer being adapted to provide a signal responsive to the position of the movable element; and connection means for connecting the movable element and said members, the connection means including a resilient lamina and supporting means for supporting the movable element, the supporting means being connected to the resilient lamina and arranged substantially in an axial direction of the gauge.

In U.S. Pat. Nos. 3,958,338 and 3,958,337 there are described electronic plug gauges particularly adapted for checking small diameters (for example diameters with nominal value of 3 mm).

One of the gauges disclosed by U.S. Pat. No. 3,958,338 comprises two feelers mounted on two flexible laminae or sections of laminae. The laminae have two ends welded to the gauge frame. The feelers are movable, in consequence of the bending of the laminae, substantially in a radial direction with respect to the gauge and to the bore to be checked, depending on the actual value of the part diameter.

The radial movement of the two feelers is transformed in a movement substantially axial of a movable element of a position transducer, through a third lamina which connects the first two laminae or lamina sections and a wire, connected between a point of the third lamina and the movable element of the transducer, and tightened by a spring.

Another electronic gauge, disclosed by U.S. Pat. No. 3,958,337, also comprises two stiffening elements coupled to the central section of the laminae supporting the feelers and two stiffening elements arranged between these laminae and the third lamina.

There are other known mechanical gauges for checking inside diameters, so called small hole gauges, comprising two longitudinal elements, obtained from the machining of a single part, that are flexible in correspondence of two thin cross-sections, in order to allow a radial movement of their free ends. These free ends have parts adapted to contact the bore walls. As the two longitudinal elements move apart, a third longitudinal element moves in an axial direction. The third element consists of a transmission rod ending with a tapered part whose walls contact associated stop limit surfaces of the first two elements. The rod activates a spindle of a dial gauge, which provides indications depending on the axial position of the rod.

These mechanical gauges, which are plainly and inexpensively built, have a considerably broad application range and are easy to use, can only be employed whenever accuracy and measurement repeatability are not required at high levels. In fact, the quality standards of performance are badly affected, for example, by the presence of sliding surfaces whose conditions of contact can depend on friction, wear and dirt.

Consequently, in general, not only the constructional features, but the field of application too of mechanical gauges differ from those of electronic gauges.

An object of the inventions disclosed in the two formerly mentioned patents is that of providing electronic gauges in which the dimensions and the complexity of the component parts are reduced with respect to gauges including movable rigid arms, fulcrum means to associate the movable arms with the gauge frame, and connection and/or transmission parts arranged between the movable arms and the transducer means.

The technical problem that the present invention intends to solve is that of providing a gauge suitable for checking small diameters, that is plainer and cheaper to manufacture as compared to the known electronic gauges, that is particularly robust and can guarantee accuracy and repeatability at least up to the levels reached in the past for similar checks.

This problem is solved by a plug gauge of the type mentioned at the beginning of this description wherein, according to the invention, the supporting section and the movable elements substantially comprise a single part including a base, corresponding to the supporting section, and a portion—adjacent to the base—with a longitudinal cut splitting this portion in two half-portions corresponding to said members; this single part having, near the end of the longitudinal cut adjacent to the base, two thin flexible sections acting as fulcrums to allow the displacement of the movable members with respect to the base, the resilient lamina being arranged between the half-portions, near the other end of the longitudinal cut.

The invention is now described in more detail with reference to the accompanying drawing given by way of non-limiting example, in which.

Figures 1, 2:
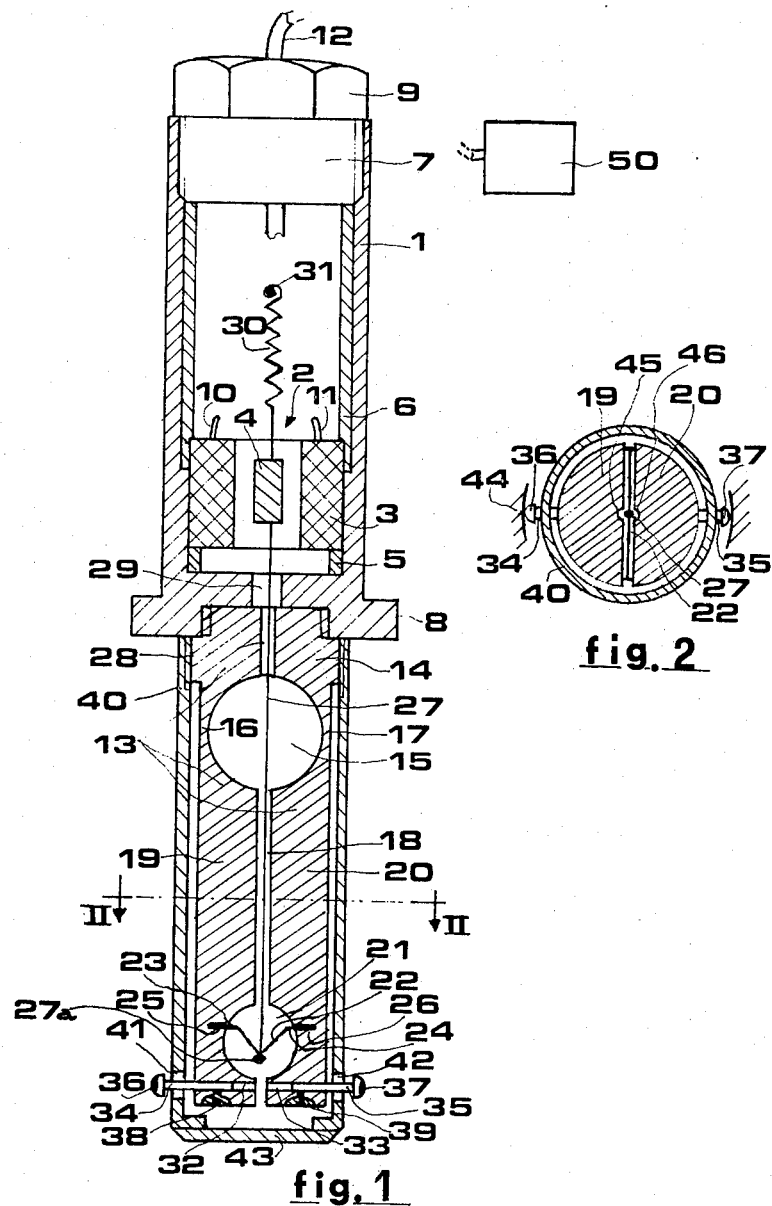
FIG. 1 is a longitudinal section of a gauge according to a preferred embodiment of the invention.
FIG. 2 is a cross-section of the gauge illustrated in FIG. 1, according to path II—II of FIG. 1.

The gauge illustrated in FIGS. 1 and 2 is manually operated and it has a cylindrical handle 1 housing, at its interior, a differential transducer 2.

The differential transducer 2 comprises a coil 3 with a primary winding and two secondary windings and a core 4 movable according to the gauge axis, which coincides with that of handle 1.

Coil 3 is held into position by a ring 5, a sleeve 6 and a threaded bush 7, screwed inside handle 1, cooperating with sleeve 6 by pushing, by means of the latter, coil 3 towards ring 5. Ring 5 rests on a plate 8 of handle 1. A nut 9 clamps bush 7.

Electric wires 10 and 11 are connected to the windings of coil 3 and protrude from handle 1 by passing inside a cable 12 housed in a suitable bore of bush 7.

A body 13 having an outside surface basically of a cylindrical shape has an upper part 14 screwed to the lower part of plate 8.

In body 13 there is a transversal bore 15 having a geometrical axis perpendicular to the axis of body 13, i.e. to the axis of the gauge, and lying on a same plane (perpendicular to the plane of FIG. 1).

The diameter of bore 15 is such as to define two thin resilient laminae 16 and 17 in a longitudinal section of body 13.

Below bore 15 a longitudinal cut 18 of body 13 splits the corresponding portion of the body in two parts 19 and 20.

Near the bottom end of body 13 there is another transversal bore 21, of a smaller diameter with respect to that of bore 15 and having a geometrical axis parallel to that of bore 15.

In bore 21 there is housed a lamina 22 with a "V" shaped section, and with two lateral appendixes 23 and 24 inserted in associated seats 25 and 26 obtained in parts 19 and 20. Lamina 22 has a bore at the "V" apex through which passes a wire 27 ending with a limit stop ball 27a that cooperates with the lower part of the lamina.

Wire 27, by passing through the longitudinal cut 18, a bore 28 —obtained in the upper part 14 of body 13 —and another bore 29 in plate 8, is connected to an end of core 4. A spring 30 has an end coupled to a pin 31, fixed to handle 1, and the other end connected to the upper end of core 4. Spring 30 keeps wire 27 stretched according to an axial direction of the gauge.

Close to bore 21 the two sections 19 and 20 have radial bores 32 and 33 that are perpendicular to the longitudinal cut 18, wherein are placed spindles 34 and 35 that end with feelers 36 and 37. Spindles 34 and 35 are clamped in the working position by means of screws 38 and 39.

A protection and centering nosepiece 40 has its upper part tightened to part 14 of body 13 and on its lower part there are bores 41 and 42 for the passage of spindles 34 and 35. A circular plate 43 closes the bottom part of nosepiece 40.

Parts 19 and 20 basically form two rigid arms rotating around fulcrums defined by laminae 16 and 17. As the two arms 19 and 20 move towards one another, lamina 22 bends, causing its bottom edge to lower. By suitably selecting the angle defined by the two legs of the lamina 22 (when the gauge is in "zero setting" conditions), it is possible to obtain, in consequence of a relative approach of contacts 36 and 37, an axial movement towards the exterior of the edge of lamina 22 and consequently of wire 27 and core 4 of the same amount as that of the relative approach.

Having to check bores of a known nominal diameter of pieces 44 (FIG. 2), it is necessary to use a nosepiece 40 that will guarantee the centering of the gauge by making the axis of the gauge coincide with that of the bores and by causing the feelers 36 and 37 to be arranged according to the diameter of the bores.

After having chosen a nosepiece 40 of a suitable diameter, the gauge is set to zero in a known way by using a master piece, by adjusting the position of spindles 34 and 35 and by performing electrical adjustments that are achieved by turning a potentiometer, located on an indicating unit 50 to which cable 12 is connected. Then nosepiece 40 is inserted successively in the various bores to be checked and the indicating unit 50 will display the deviations of the bores from the nominal size.

Internally arms 19 and 20 have grooves 45 and 46 in order to prevent them from contacting wire 27 when they move towards each other and touch.

The inside diameter of nosepiece 40 can be chosen so that in the rest position arms 19 and 20 contact the inside surface of the nosepiece, thus defining stroke limits to fix the maximum setting apart of arms 19 and 20.

If the thickness of nosepiece 40 is known, it can be usefully considered when mechanically zero setting the gauge.

The manufacture of movable arms 19 and 20 from a single piece, not only results in manufacturing simplicity and cost savings, but it also ensures exceptional robustness, accuracy and repeatability.

In the manufacture of the gauge the most delicate operation consists in the achievement of bore 15 which must have a diameter such as to determine the suitable thickness of the laminae 16 and 17.

Just by this operation one obtains two fulcrums, known per se, which guarantee exceptional gauge performance.

Furthermore, according to this technology it is possible to manufacture a gauge having rigid movable arms, and with well defined geometry, also suitable for checking particularly small diameters, for example of three mm. approximately.

The ends of lamina 22, which can also be manufactured according to a different shape from the flat one here illustrated (e.g. with a curled shape), can be directly clamped to arms 19 and 20 or to intermediate elements.

The intermediate elements can consist, for example, of splined pins connectable in turn to seats of arms 19 and 20.

The shape of the lamina can also be different from the "V" one, for example it can be a rhombus or semicircle, etc.

The connection of wire 27 to the lamina by means of limit stop ball 27a is of particular utility to simplify the manufacturing and assembly operations and for this reason it is preferable. Nevertheless other connection means, like soldering, hooking, or similar can be used.

It is evident that the embodiment described can undergo modifications and variants equivalent from a functional and structural point of view, without departing from the scope of the invention.

What is claimed is:

1. Plug gauge for checking internal geometrical dimensions of bores of mechanical parts, comprising a supporting section, two members associated with said section and movable with respect to the same, two feelers adapted to contact the part to be checked, each feeler being coupled to a relevant movable member in such a way as to be movable substantially in a radial direction with respect to a longitudinal axis of the gauge, a position transducer, with a movable element, the transducer being adapted to provide a signal responsive to the position of the movable element, and connection means for connecting said movable element and said members, the connection means including a resilient lamina and supporting means for supporting the movable element, the supporting means being connected to the resilient lamina and arranged substantially in an axial direction of the gauge, wherein the supporting section and the movable members substantially comprise a single part including a base, corresponding to the supporting section, and a portion, adjacent to the base, with a longitudinal cut splitting this portion in two half-portions corresponding to said members; this single part having near the end of the longitudinal cut adjacent to the base two thin flexible sections acting as fulcrums to allow the displacement of the movable members with respect to the base, said resilient lamina being arranged between the half-portions, near the other end of the longitudinal cut.

2. The gauge according to claim 1, wherein said single part defines—near the other end of the longitudinal cut—a transversal bore perpendicular to the cut; this transversal bore providing space for the seating of the resilient lamina; the resilient lamina having two appendixes respectively coupled to the members and a part movable according to the gauge axis direction in consequence of the feelers moving towards and away from each other.

3. The gauge according to claim 1 or claim 2, wherein the supporting means of the movable element include a wire having an end connected to the lamina and the other end connected to the movable element of the transducer, and resilient means adapted to keep the wire stretched according to said axial direction.

4. The gauge according to claim 3, wherein the members define grooves to house the wire when the members move towards each other.

5. The gauge according to claim 3, wherein the lamina defines a bore for the passage of the wire; the wire end connected to the lamina consisting of a stopping element adapted to cooperate with the lamina.

6. The gauge according to claim 1, including a protection and centering nosepiece, wherein the nosepiece is clamped to the base of said single part, in order to allow disassembly and replacement.

7. The gauge according to claim 6, wherein the inside surface of the nosepiece defines stroke limits to fix the maximum setting apart position of the members.

8. The gauge according to claim 1, wherein the movable members define associated bores perpendicular to the longitudinal cut, for housing feeler-holder elements in these bores.

9. The gauge according to claim 1, comprising a handle for manually using the gauge, wherein the base of the single part is clamped to the handle.

* * * * *